UNITED STATES PATENT OFFICE.

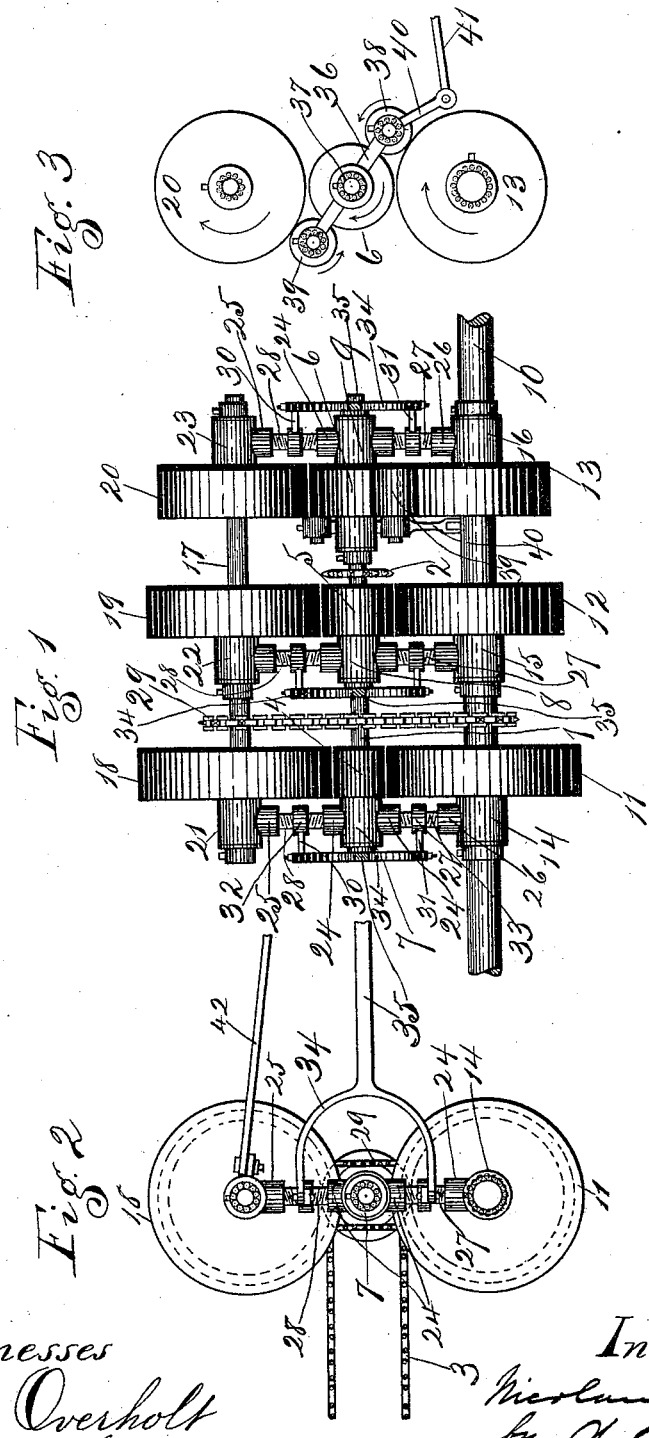

NICOLAUS LEIDGEN, OF MILWAUKEE, WISCONSIN.

VARIABLE-SPEED FRICTIONAL GEAR.

SPECIFICATION forming part of Letters Patent No. 579,663, dated March 30, 1897.

Application filed July 10, 1896. Serial No. 598,719. (No model.)

*To all whom it may concern:*

Be it known that I, NICOLAUS LEIDGEN, a citizen of the United States, residing at Milwaukee, in the county of Milwaukee and State of Wisconsin, have invented certain new and useful Improvements in Variable-Speed Frictional Gears; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to variable-speed frictional gears adapted to be applied to motorcycles, launches, and motors of various other kinds wherein it is desirable to employ variable-speed mechanism for regulating the speed.

The object of the invention is to provide simple and efficient means for quickly changing the speed and to provide means in a frictional gear of the kind referred to which will relieve the driving-shaft of undue friction in its bearing and undue strain thereon. It has further for its object to provide simple and efficient means for reversing the motor or speed gearing.

To the accomplishment of the foregoing and such other objects as may hereinafter appear the invention consists in the construction and in the combination of parts hereinafter particularly described, and then sought to be specifically defined by the claims, reference being had to the accompanying drawings, forming a part hereof, and in which—

Figure 1 is a side elevation of the speed-gearing; Fig. 2, an end elevation looking from the left of Fig. 1; and Fig. 3 an end elevation of one set of the speed-gears, illustrating the application of the reversing frictional gears to the driving-gear.

In the drawings the numeral 1 designates the drive-shaft, which may be provided with a sprocket-wheel 2 so as to derive power through a chain 3 from a suitable source, but it may derive power in any other suitable manner. The drive-shaft carries a series of friction-wheels 4, 5, and 6, rigidly secured thereto and suitably spaced apart and each of a different diameter, as illustrated. While I have shown three of these frictional wheels still it will be understood that the number may be more or less, as desired. This drive-shaft will have its bearing in suitable boxes 7, 8, and 9, there being employed a box adjacent to each one of the frictional wheels 4, 5, and 6, and each box will preferably have ball-bearings, so as to reduce the friction.

Parallel with the drive-shaft 1 is the driven shaft 10, which carries a series of frictional wheels 11, 12, and 13, rigidly secured to the shaft and lying opposite to the frictional wheels on the drive-shaft. The driven shaft has its bearings in boxes 14, 15, and 16, which will be provided with ball-bearings, so as to reduce the friction.

Parallel with the drive-shaft 1 and on the opposite side thereof from the driven shaft is another shaft 17, which I will designate as an "idler-shaft," and this shaft carries a series of frictional wheels 18, 19, and 20, lying opposite to the frictional wheels of the drive-shaft and rigidly secured to the idler-shaft. The idler-shaft has its bearings in boxes 21, 22, and 23, which, like the other boxes, will have ball-bearings, so as to reduce friction.

It will be observed that the frictional wheels on the drive-shaft increase progressively in diameter from one end of the shaft toward the other, and that the frictional wheels on the driven shaft and on the idler-shaft decrease in diameter progressively from one end of each of the shafts toward the other and in the direction in which the wheels on the drive-shaft increase in diameter, so that by bringing any one set of the frictional wheels on the driven shaft and on the idler-shaft in contact with the intermediate frictional wheel on the drive-shaft the speed at which the driven shaft is rotated may be varied.

For the purpose of bringing the frictional wheels on the idler-shaft and on the driven shaft into contact with their respective intermediate frictional wheels on the drive-shaft I provide each of the boxes on the drive-shaft with oppositely-extending thimbles 24, and each of the boxes on the idler-shaft with an inwardly-extending thimble 25 in line with the thimbles to the boxes to the drive-shaft, and each of the boxes on the driven shaft with an inwardly-extending thimble 26, likewise in line with the thimbles on the boxes of the drive-shaft. The thimbles 24 are connected to the thimbles 26 by the screw-shafts 27, having right and left threads, and the opposite thimbles 24 are connected to the thimbles 25 by screw-shafts 28, having right and left threads, so that when the shafts 27 and 28 are turned in one direction the friction-wheels of both the idler-shaft and driven shaft can be drawn toward and into contact with their respective frictional wheels on the drive-shaft, and with more or less frictional contact according as the screw-shafts are turned more or less. It will be observed that the screw-shafts to each set of the frictional wheels are independent of the others, so that any one set of the frictional wheels may be brought into contact with the intermediate frictional wheel on the drive-shaft without necessarily bringing the others into contact with their frictional wheels. In this way by bringing any one set into contact with its intermediate frictional wheel on the drive-shaft the speed may be varied, and therefore the whole constitutes a variable frictional speed-gear.

Ordinarily the drive-shaft rotates at a high rate of speed, and if its frictional wheels be allowed to come in contact with the frictional wheels on the driven shaft without some equalizing bearing on the opposite side of the drive-shaft there will be considerable strain put upon the drive-shaft and increased friction of the drive-shaft in its boxes will be caused; but by providing the frictional wheels on the idler-shaft and having those wheels brought into contact with the frictional wheels on the drive-shaft at the same time contact is made with the frictional wheels on the driven shaft this strain and friction is relieved and the parts made to run easier and with less wear, and hence the advantage of employing the idler-shaft and its frictional wheels in the device.

In order to utilize the power given to the idler-shaft by contact of its frictional wheels with wheels on the drive-shaft, I connect the idler-shaft with the driven shaft by means of, say, a sprocket chain belt 29 and sprocket-wheels on each of said shafts, as indicated in Fig. 1 of the drawings.

Each of the two shafts 27 and 28 may be turned by suitable means. The means which I prefer consist of arms 30 and 31, rigidly connected by collars 32 and 33 to the shafts 27 and 28, respectively, and a yoke 34, which will connect the two arms, said yoke being provided with an operating-handle 35, so that the shaft 27 will be turned simultaneously with the shaft 28, and thus the frictional wheels on the driven shaft and idler-shaft will be brought simultaneously into and out of contact with their intermediate frictional wheels on the drive-shaft. It will be understood that the screw-shafts of each set of the wheels will be provided with this or some other suitable means, so that each set can be operated independently of the others and thus permit the desired wheels to be brought into or out of contact.

The extent of lateral movement of the driven shaft to permit its friction-wheels to be brought into contact with the wheels on the drive-shaft is very slight, and the driven shaft will yield sufficiently for that purpose.

In order that the variable-speed gear may be reversed, I attach an oscillating arm 36 to the drive-shaft by means of a ball-bearing box 37, and to the opposite ends of the oscillating arm 36 are attached friction-wheels 38 and 39, both of which are in contact with the periphery of the friction-wheel on the drive-shaft and adapted when the oscillating arm is thrown in one direction to have the friction-wheel 38 to contact with the friction-wheel on the driven shaft and the friction-wheel 39 contact with the friction-wheel on the idler-shaft, the friction-wheels on the driven shaft and on the idler-shaft at such time being out of contact with the friction-wheel on the drive-shaft. With the parts thrown into the position illustrated motion will be transmitted from the friction-wheel on the drive-shaft through the friction-wheel 39 on one end of the oscillating shaft to the friction-wheel on the idler-shaft and through the frictional wheel 38 at the opposite end of the oscillating shaft to the friction-wheel on the driven shaft, so that the parts will rotate in the direction indicated by arrows in Fig. 3 of the drawings, which is the opposite direction to that in which the friction-wheel on the idler-shaft and on the driven shaft will rotate when the friction-wheel on the drive-shaft is in contact therewith and the friction-wheels on the oscillating shaft are out of contact therewith. The shafts of the friction-wheels 38 and 39 will be journaled in ball-bearing boxes carried by the oscillating shaft, as indicated in Fig. 3 of the drawings, and the oscillating shaft will have an arm 40 projecting therefrom, to which will be connected a lever 41 for operating the oscillating shaft, as indicated in Fig. 2 of the drawings. I have shown this reversing means applied to only one set of the friction-wheels shown in Fig. 1 of the drawings, but it will be understood that the same construction should be applied to each set, the construction and mode of operation being the same in each case, and consequently one illustration will answer for all.

The numeral 42 designates a brace-rod, of which any desired number may be employed, for attaching the speed-gear to the motor.

I have illustrated and described with particularity what I consider to be the preferred details of construction and arrangement of the several parts, but it is obvious that changes can be made therein without departing from the essential features of my invention.

Having described my invention and set forth its merits, what I claim is—

1. In a variable-speed gear, the combination of a drive-shaft provided with frictional wheels, a driven shaft provided with corresponding frictional wheels opposite to the wheels on the drive-shaft, a third shaft on the opposite side of the drive-shaft and provided with a corresponding number of frictional wheels opposite to the wheels on said shaft, and means for moving the wheels on the two outside shafts into and out of contact with the wheels on the drive-shaft, each set independently of the others, substantially as and for the purposes described.

2. In a variable-speed gear, the combination of a drive-shaft provided with frictional wheels, a driven shaft provided with corresponding frictional wheels opposite to the wheels on the drive-shaft, an idler-shaft on the opposite side of the drive-shaft and provided with a corresponding number of frictional wheels opposite to the wheels on said shaft, means for moving the wheels on the driven shaft and the idler-shaft to and from the wheels on the drive-shaft, and a power-transmitting belt connecting the idler-shaft to the driven shaft, substantially as and for the purposes described.

3. In a variable-speed gear, the combination of a drive-shaft provided with frictional wheels, a driven shaft provided with corresponding frictional wheels opposite to the wheels on the drive-shaft, a third shaft on the opposite side of the drive-shaft and provided with a corresponding number of frictional wheels opposite to the wheels on said shaft, bearings for each of said shafts corresponding in number to the number of wheels on the shaft, and adjusting means connecting the bearings of the outside shafts with the corresponding bearings of the drive-shaft for adjusting to and from the wheels on the drive-shaft their corresponding wheels on the other shafts, each set independently of the others, substantially as and for the purposes described.

4. In a variable-speed gear, the combination of a drive-shaft provided with frictional wheels, a driven shaft provided with corresponding frictional wheels opposite to the wheels on the drive-shaft, a third shaft on the opposite side of the drive-shaft and provided with a corresponding number of frictional wheels opposite to the wheels on said shaft, bearings for each of said shafts corresponding in number to the number of wheels on the shaft, screw-shafts having right and left threads and connecting the bearings of the outside shafts with the corresponding bearings of the drive-shaft, and means for turning said screw-shafts to adjust to and from the wheels on the drive-shaft their corresponding wheels on the other shafts, each set independently of the others, substantially as and for the purposes described.

5. In a frictional speed-gear, the combination of a drive-shaft provided with a frictional wheel, a driven shaft provided with a corresponding frictional wheel, a third shaft on the opposite side of the drive-shaft and provided with a corresponding frictional wheel, means for moving the wheels on the outside shafts to and from contact with the wheel on the drive-shaft, and a reversing device consisting of an oscillating arm carrying frictional wheels to contact with the friction-wheel on the drive-shaft and adapted to be thrown into contact with the frictional wheels on the outside shafts when the drive-shaft wheel is out of contact with the wheels on said shafts for the purpose of reversing the speed-gear, substantially as and for the purposes described.

In testimony whereof I affix my signature in presence of two witnesses.

NICOLAUS LEIDGEN.

Witnesses:
JOHN H. KOENIG,
CHARLES FORSYTH.